(12) United States Patent
Suzuki et al.

(10) Patent No.: US 10,783,366 B2
(45) Date of Patent: Sep. 22, 2020

(54) COMPUTER AND DOCUMENT IDENTIFICATION METHOD

(71) Applicant: HITACHI, LTD., Tokyo (JP)

(72) Inventors: Yasufumi Suzuki, Tokyo (JP); Hiroshi Shinjo, Tokyo (JP); Ryosuke Odate, Tokyo (JP); Masahiro Motobayashi, Tokyo (JP)

(73) Assignee: HITACHI, LTD., Tokyo (JP)

( * ) Notice: Subject to any disclaimer, the term of this patent is extended or adjusted under 35 U.S.C. 154(b) by 156 days.

(21) Appl. No.: 16/117,198

(22) Filed: Aug. 30, 2018

(65) Prior Publication Data

US 2019/0138804 A1    May 9, 2019

(30) Foreign Application Priority Data

Nov. 6, 2017  (JP) .................................. 2017-214170

(51) Int. Cl.
G06K 9/62       (2006.01)
G06K 9/00       (2006.01)
G06K 9/03       (2006.01)

(52) U.S. Cl.
CPC ..... G06K 9/00442 (2013.01); G06K 9/00993 (2013.01); G06K 9/03 (2013.01); G06K 9/6262 (2013.01); *G06K 2209/01* (2013.01)

(58) Field of Classification Search
CPC .... G06K 9/6267; G06K 9/62; G06K 2209/01; G06K 9/00442; G06K 9/00288;

(Continued)

(56) References Cited

U.S. PATENT DOCUMENTS 5,251,273 A * 10/1993 Betts ...................... G06K 9/033
                                                                   283/74
5,644,656 A *  7/1997 Akra ..................... G06K 9/6202
                                                                   382/195

(Continued)

OTHER PUBLICATIONS

Das et al., Survey of Pattern Recognition Approaches in Japanese Character Recognition, 2014, International Journal of Computer Science and Information Technologies, vol. 5(1),pp. 93-99. Retrieved: https://pdfs.semanticscholar.org/d32b/cdc6c219e617462fa301f5b1de1196be1b63.pdf (Year: 2014).*

*Primary Examiner* — Andrew M Moyer
*Assistant Examiner* — Dennis Rosario
(74) *Attorney, Agent, or Firm* — Baker Botts L.L.P.

(57) ABSTRACT

A computer that extracts an attribute which is a text string contained in an predetermined examination target document stores template information for managing a plurality of templates in which a type of attribute is defined, executes a text recognition process on image data of the document, extracts an attribute corresponding to the type of attribute using a result of the text recognition process and the plurality of templates, selects a template based on the extracted attribute, generates output information that includes the attribute extracted using the selected template and is used for the examination; determines a type of confirmation operation performed on the output information, before the examination, based on a comparison result between an evaluation value indicating credibility of the output information and a threshold, and corrects the determined type of confirmation operation based on the text string contained in the document.

8 Claims, 14 Drawing Sheets

(58) Field of Classification Search
CPC ........ G06K 9/6262; G06K 9/03; G06K 9/036; G10L 15/063; G10L 15/1815; G06F 40/186; G06F 40/226; G06F 11/3608; G06F 16/215

See application file for complete search history.

(56) References Cited

U.S. PATENT DOCUMENTS

| | | | | |
|---|---|---|---|---|
| 5,832,100 | A * | 11/1998 | Lawton | G06K 9/00 |
| | | | | 382/100 |
| 7,668,718 | B2 * | 2/2010 | Kahn | G10L 15/063 |
| | | | | 704/270 |
| 8,630,949 | B2 | 1/2014 | McLaughlin et al. | |
| 10,534,968 | B1 * | 1/2020 | Clauss | G06Q 40/08 |
| 10,552,674 | B2 * | 2/2020 | Watanabe | G06K 9/6202 |

* cited by examiner

FIG. 3

TEMPLATE INFORMATION 221

| TEMPLATE NUMBER (301) | ATTRIBUTE (302) | POSITIONAL INFORMATION (303) | REQUESTER NAME (304) |
|---|---|---|---|
| 1 | BILLING AMOUNT | (X11,X12) | A CORPORATION |
| 1 | BANK NAME | (X21,X22) | A CORPORATION |
| 1 | BANK BRANCH NAME | (X31,X32) | A CORPORATION |
| 1 | TYPE OF BANK ACCOUNT | (X41,X42) | A CORPORATION |
| 1 | BANK ACCOUNT NUMBER | (X51,X52) | A CORPORATION |
| 2 | BILLING AMOUNT | (X61,X62) | B STORE |
| 2 | BANK NAME | (X71,X72) | B STORE |
| 2 | BANK BRANCH NAME | (X81,X82) | B STORE |
| 2 | TYPE OF BANK ACCOUNT | (X91,X92) | B STORE |
| 2 | BANK ACCOUNT NUMBER | (X101,X102) | B STORE |
| ⋮ | ⋮ | ⋮ | ⋮ |

FIG. 4

WORD DICTIONARY 222

| ATTRIBUTE (401) | TEXT STRING (402) |
|---|---|
| BANK NAME | BANK XXX<br>BANK XXX<br>BANK AA<br>BANK AA<br>... |
| BRANCH NAME | BRANCH YYY<br>BRANCH YYY<br>BRANCH BB<br>BRANCH BB<br>STORE<br>... |
| TYPE OF BANK ACCOUNT | REGULAR<br>CHECKING<br>REGULAR<br>CHECKING<br>REGULAR ACCOUNT<br>CHECKING ACCOUNT<br>(REGULAR)<br>(CHECKING) |

FIG. 5

NOTATION DICTIONARY 223

| ATTRIBUTE (501) | NOTATION (502) |
|---|---|
| ACCOUNT NUMBER | N<br>NN<br>NNN<br>NNNN<br>NNNNN<br>NNNNNN<br>NNNNNNN |
| AMOUNT | ¥NN, NNN<br>NN,NNN YEN<br>... |
| DATE | NN. NN. NN<br>NN MONTH, NN DAY, NN YEAR |

FIG. 6

RISK SPECIFYING RULE MANAGEMENT INFORMATION 224

600-1

| REQUESTER NAME (611) | REFERENCE AMOUNT VALUE (612) |
|---|---|
| CORPORATION A | 50,000 YEN |
| STORE B | 100,000 YEN |
| ⋮ | ⋮ |

600-2

| RISK WORK (621) |
|---|
| TAX OF EARNINGS |
| TOTAL BILLING AMOUNT |
| ⋮ |

FIG. 7

CORRECTION RULE MANAGEMENT INFORMATION 225

| CLASS CONDITION (701) | CONDITIONAL EXPRESSION (702) | CORRECTION CLASS (703) |
|---|---|---|
| CASE 1 | B | CLASS 2 |
| CASE 0 | A ∨ B | CLASS 1 |

FIG. 10

OCR ELEMENT 902

| | | |
|---|---|---|
| 1001 | ATTRIBUTE | BILLING AMOUNT |
| 1002 | ITEM VALUE | "BILLING AMOUNT"; "10,000 YEN"; |
| 1003 | POSITION | (x11,x12); (x21,x22); |
| 1004 SCORE | OCR SCORE | 80 |
| | POSITION SCORE | 26 |

FIG. 18

TEMPLATE INPUT SCREEN — 1800

1810

| DOCUMENT ID | APPLICATION DATE |
|---|---|
| 1234 | 7/1 |
| 1231 | 7/1 |
| 1222 | 6/30 |
| 1215 | 6/30 |
| 1208 | 6/30 |

ADD — 1820

1830

| ATTRIBUTE |
|---|
| BILLING AMOUNT |
| BANK NAME |
| BANK BRANCH NAME |
| TYPE OF BANK ACCOUNT |
| BANK ACCOUNT NUMBER |

ADD — 1840

1850

BILL

JUNE 29 2017

TO CORPORATION A

STORE B

AMOUNT 1,234 YEN

PLEASE TRANSFER THE ABOVE AMOUNT TO THE FOLLOWING ACCOUNT.

TRANSFER ACCOUNT

| BANK XX | BRANCH YY |
| REGULAR | 1234567 |

REGISTER — 1860

COMPUTER AND DOCUMENT IDENTIFICATION METHOD

CLAIM OF PRIORITY

The present application claims priority from Japanese patent application JP 2017-214170 filed on Nov. 6, 2017, the content of which is hereby incorporated by reference into this application.

BACKGROUND OF THE INVENTION

Field of the Invention

The present invention relates to a computer and a method for identifying a document.

Background Art

With advance of digitization, chances to use electronic application have increased. In the electronic application, all of the target documents or the like are not digitized, but images generated by scanning paper-based documents or papers are used in many cases.

In the present specification, a digitized document is referred to as an electronic-based document and an image generated by scanning a document based on paper and a paper is referred to as a paper-based document. When it is not necessary to distinguish the electronic-based document and the paper-based document from each other, the electronic-based document and the paper-based document are also simply referred to as documents.

For example, in work for incomings and outgoings in a corporation, a procedure is performed in which (1) an applicant receives a bill from a requester, (2) the applicant submits the bill on which payment of a request amount to the requester is written to a financial department by electronic application, and (3) a human staff of the financial department confirms attributes written on the bill and pays the amount of bill to the requester from the corporation when the electronic application is determined to be appropriate.

Here, the attributes are subjects of examination and are text strings indicating characteristics of documents. For example, in the case of working for incomings and outgoings, the attributes correspond to a name and a title of a requester, billing content, a billing amount, a billing date, a payment deadline, and a bank account number of a transfer destination of the billing amount.

In the case of electronic application in which paper-based documents are treated, it is necessary for human staffs to confirm the paper-based documents. Therefore, there are problems that work efficiency is low and cost necessary for the work is large.

To take countermeasures against the above-described problems, a method of reading attributes from a paper-based document using an optical character recognition (OCR) technology is known. For example, the technology disclosed in U.S. Pat. No. 8,630,949 is known.

U.S. Pat. No. 8,630,949 discloses "a method of electronically presenting bills of customers and including receiving an electronic bill and a paper bill from a customer, generating electronic image information from the paper bill, extracting first OCR data from the electronic image information through scanning, retrieving a numerical identifier of at least one type of scanned paper money from the first OCR data, specifying a type of scanned paper bill from a comparison result of the numerical identifier, extracting second OCR data from electronic image information using a template corresponding to the specified type of paper bill, extracting bill information from the second OCR data, comparing the bill information with known information, and presenting a customer bill in which the electronic bill and the bill information are combined.

Since the technology disclosed in U.S. Pat. No. 8,630,949 is used to reduce the number of steps of a process performed by a human staff in electronic application work, it is possible to improve work efficiency and reduce cost necessary for work.

SUMMARY OF THE INVENTION

In the technology described in U.S. Pat. No. 8,630,949, it is necessary to preset a numerical identifier and a type of bill. However, when a document containing similar attributes is used and there is electronic application in which examination content is different, there is a possibility that a user may not appropriately associate the numerical identifier with the type of bill. A possibility that no numerical identifier is contained can also be considered. It is necessary to generate a template for each type of bill. There is also a possibility that a template corresponding to the numerical identifier and the type of bill is changed due to a change in a format of the bill.

Accordingly, in the technology of the related art, extraction precision of attributes is low when an optimum template may not be selected, and an advantage of improving work efficiency and reducing cost necessary for work is low.

Through automatic identification performed using a device, it is possible to improve work efficiency and reduce cost necessary for work. On the other hand, there is a possibility that a work-related loss occurs due to examination based on erroneous automatic identification or the like. Accordingly, in the automatic identification performed using a device, a structure capable of suppressing the above-described work-related loss is necessary.

The invention provides a device and a document identification method capable of preventing occurrence of a work-related loss and extracting attributes to be used for examination with high precision.

A representative example of the invention disclosed in the present specification is as follows. That is, a computer extracts an attribute which is a text string contained in a predetermined examination target document. The computer includes a processor and a storage device that is connected to the processor. The storage device stores template information for managing a plurality of templates in which at least one type of attribute is defined. The template information includes a plurality of entries formed of identification information of the template and identification information indicating the type of attribute. The processor executes a text recognition process on image data of the document, extracts an attribute corresponding to the type of attribute defined in each of the plurality of templates using a result of the text recognition process and the plurality of templates, selects a template based on the extracted attribute, generates output information that includes the attribute extracted using the selected template and is used for the examination, calculates an evaluation value indicating credibility of the output information, determines a type of confirmation operation performed on the output information, before the examination, based on a comparison result between the evaluation value and a threshold, determines whether it is necessary to correct the determined type of confirmation operation, based on a text string contained in the document, and corrects the determined type of confirmation operation when the processor determines that it is necessary to correct the determined type of confirmation operation.

According to the invention, it is possible to prevent occurrence of a work-related loss and extract attributes to be used for examination with high precision from the document. Problems, configurations, and advantages other than the foregoing problems, configurations, and advantages are apparent from description of the following embodiments.

BRIEF DESCRIPTION OF THE DRAWINGS

FIG. 3 is a diagram illustrating an example of a data structure of template information according to the first embodiment.

FIG. 4 is a diagram illustrating an example of a data structure of a word dictionary according to the first embodiment.

FIG. 5 is a diagram illustrating an example of a data structure of a notation dictionary according to the first embodiment.

FIG. 6 is a diagram illustrating an example of a data structure of risk specifying rule management information according to the first embodiment.

FIG. 7 is a diagram illustrating an example of a data structure of correction rule management information according to the first embodiment.

FIG. 10 is a diagram illustrating an example of a data structure of an OCR element generated by the document examination module according to the first embodiment.

FIG. 18 is a diagram illustrating an example of a template input screen displayed by the computer according to the first embodiment.

DETAILED DESCRIPTION OF THE INVENTION

Figure 1:
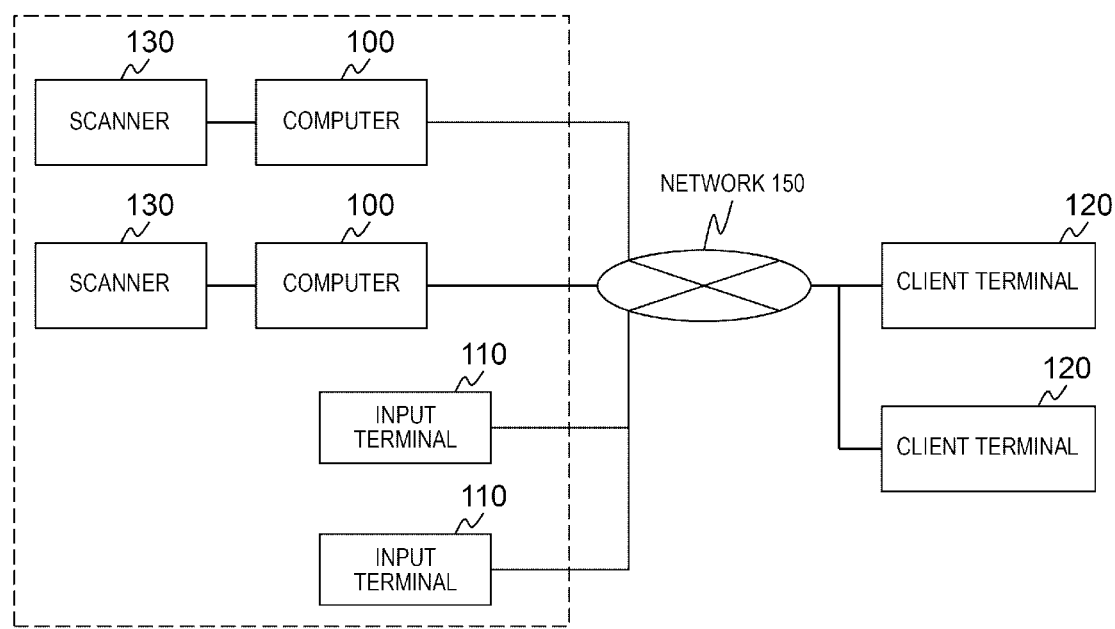
FIG. 1 is a diagram illustrating a configuration example of a system according to a first embodiment.

Hereinafter, embodiments of the present invention will be described with reference to the drawings.

In the drawings referred to describe embodiments, the same reference numerals are given to portions that have the same functions and the repeated description thereof will be omitted. In the embodiments to be described below do not limit the invention in the claims. Elements and combinations of the elements to be described in the embodiments are not all requisite for solutions to the invention.

In the following description, an expression "xxx table" is used as an example of information in some cases, but any data structure of the information can be used. That is, in order to indicate that information does not depend on a data structure, "xxx table" can be said to be "xxx information". In the following description, the configuration of each table is exemplary. One table may be partitioned into two or more tables or all or some of the two or more tables may be one table.

First Embodiment

FIG. 1 is a diagram illustrating a configuration example of a system according to a first embodiment.

The system includes a computer 100, input terminals 110, client terminals 120, and scanners 130. The computers 100, the input terminals 110, and the client terminals 120 are connected to each other via a network 150. The scanner 130 is connected to the computer 100 directly or via a network.

The invention is not limited to the type of network 150. As the network 150, a local area network (LAN), a wide area network (WAN), or the like can be considered. The invention is not limited to a connection scheme of the network 150 and a wired or wireless network can be used. The scanner 130 may be connected to the computer 100 directly or via network.

The number of computers 100, the number of input terminals 110, the number of client terminals 120, and the number of scanners 130 included in the system according to the invention can be set to any number.

The computer 100 performs a process related to electronic application. The details of the process performed by the computer 100 will be described below.

The client terminal 120 is a terminal that is operated by a user (applicant) who performs electronic application. The user operates the client terminal 120 to input information necessary for the electronic application and submit a paper document related to the electronic application. The paper document to be submitted is considered to be, for example, a certification or the like indicating that the electronic application is legitimate.

The user may submit the paper document and directly submit the paper document to a corporation or an administrative facility that performs the electronic application. When the scanner 130 is connected to the client terminal 120, document image data 901 (see FIG. 9) is generated from the paper document using the scanner 130 and the document image data may be submitted. The invention is not limited to types of electronic application and documents to be treated. As the documents, for example, various types of documents such as bills, statements of delivery, receipts, statements of earnings, and tax notices and various certificates such as driver's licenses and national identity cards are considered.

A document to be input at the time of electronic application includes a plurality of attributes which text strings to be used for examination of electronic application. For example, when a document is a bill, a billing amount, a requester name, a request destination name, a date of issue, and a bank name for designating a transfer destination, a branch name, a text string of a type of account and an account number, and an imprint sealed by a requester are included as the attributes.

In the embodiment, the attributes are managed in association with a type of attribute (a name of an attribute) and a text string extracted as an attribute. In the embodiment, the text string is a concept including not only general text but also a sign such as an arrow, a square, and a circle.

The input terminal 110 is a terminal that is operated by an examiner who manages the computer 100 or an examiner who examines electronic application. The scanner 130 generates document image data 901 from a paper document. As the scanner 130, a flatbed scanner, a scanner with an automatic sheet feeder, or the like can be considered.

Instead of the scanner 130, a digital camera that captures an image using an element such as a charge coupled device (CCD) may be included.

Figure 2:
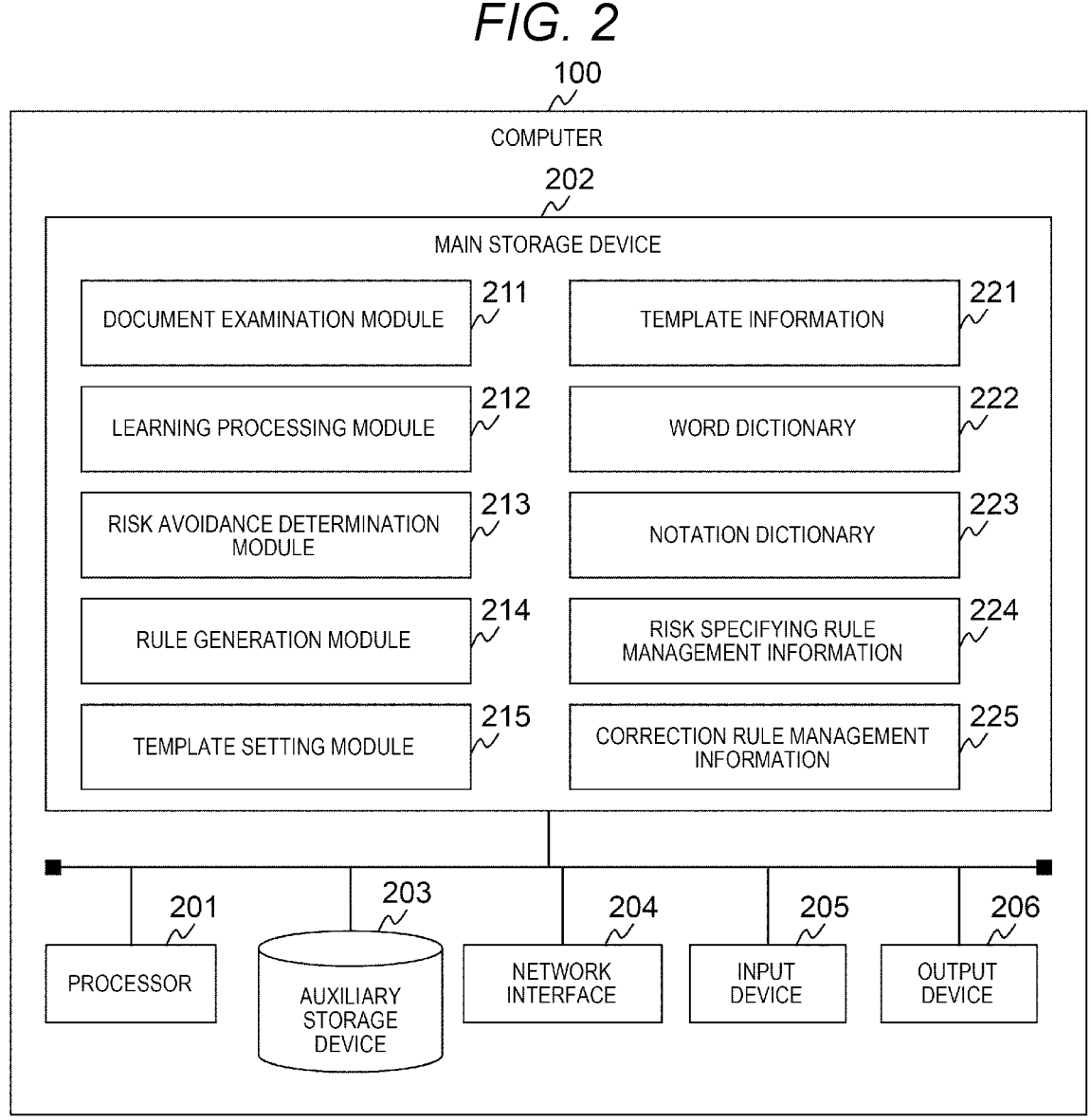
FIG. 2 is a diagram illustrating a hardware configuration and a software configuration of a computer according to the first embodiment.

FIG. 2 is a diagram illustrating a hardware configuration and a software configuration of the computer 100 according to the first embodiment.

The computer 100 includes a processor 201, a main storage device 202, an auxiliary storage device 203, a network interface 204, an input device 205, and an output device 206. Hardware units are connected to each other via an internal bus or the like. In FIG. 2, the number of hardware units is one, but may be two or more.

The configurations of the input terminal 110 and the client terminal 120 are the same as that of the computer 100.

The processor 201 executes a program stored in the main storage device 202. The processor 201 operates as a module that realizes a specific function by executing a process in accordance with the program. When a module performs a process in the following description, it is indicated that the processor 201 executes a program realizing the module.

The main storage device 202 stores a program to be executed by the processor 201 and information to be used by the program. The main storage device 202 includes a work area in which a program is temporarily used. As the main storage device 202, for example, a memory or the like is considered.

The main storage device 202 according to the embodiment stores a program that realizes a document examination module 211, a learning processing module 212, a risk avoidance determination module 213, a rule generation module 214, and a template setting module 215. The main storage device 202 stores template information 221, a word dictionary 222, a notation dictionary 223, risk specifying rule management information 224, and correction rule management information 225.

The main storage device 202 may not store the program that realizes all the modules.

The document examination module 211 performs an examination process for electronic application. Specifically, the document examination module 211 receives the electronic application and generates document summarization information 905 (see FIG. 9) that includes attributes extracted using a template. The document examination module 211 determines a type of confirmation operation performed on the document summarization information 905. In the following description, a type of confirmation operation is referred to as a class. In the embodiment, one of three classes, Case 0, Case 1, and Case 2, is determined. The document examination module 211 performs a confirmation operation on the document summarization information 905 in accordance with the determined type of confirmation operation, and subsequently examines the electronic application using the document summarization information 905. The details of a process performed by the document examination module 211 will be described below.

Here, content of the confirmation operation will be described. In Case 0, since credibility of the document summarization information 905 is high, correction of the document summarization information 905 by an examiner is not performed. In Case 1, the computer 100 prompts one examiner to input document summarization information. The examiner generates the document summarization information and operates the input terminal 110 to input the document summarization information to the computer 100. In Case 2, the computers 100 prompt two examiners to input document summarization information. The two examiners each generate document summarization information and operate the input terminals 110 to input the document summarization information to the computers 100. In the following description, document summarization information generated by a manager is referred to as input document summarization information.

The above-described three types of classes are exemplary and the invention is not limited thereto. For example, two types of classes, an operation performed for examination by one examiner and an operation not performed for examination by an examiner may be used. Two types of classes, a simple confirmation operation performed by visual observation and a detailed confirmation operation of allowing the examiner to input necessary items and determining whether data matches, may be used.

The learning processing module 212 performs learning processes related to a data selection method, an extraction method, a recommendation method, and a classification method. As algorithms for machine learning, logistic regression, decision forest, a decision jungle, a boost decision tree, a neural network, averaged perceptron, a support vector machine, a local detailed support vector machine, a Bayes point machine, and the like are known.

The risk avoidance determination module 213 corrects a class determined by the document examination module 211. A process performed by the risk avoidance determination module 213 will be described below.

The rule generation module 214 generates the risk specifying rule management information 224 and the correction rule management information 225 to be described below.

The template setting module 215 generates and changes the template information 221 to be described below.

The template information 221 is information for managing a template to read a text string used for examination from a document. The details of the template information 221 will be described with reference to FIG. 3.

The word dictionary 222 and the notation dictionary 223 are information in which a text string extracted as attributes are defined. The details of the word dictionary 222 will be described with reference to FIG. 4 and the details of the notation dictionary 223 will be described with reference to FIG. 5.

The risk specifying rule management information 224 is information for managing a risk specifying rule set in consideration of a work-related loss (risk). The details of the risk specifying rule management information 224 will be described with reference to FIG. 6. Here, the work-related loss is a concept including a monetary loss, a work confidence loss, and an examination error. The risk specifying rule is information defining a text string for specifying a type of risk which is likely to occur in examination of a document or a condition of the text string.

The correction rule management information 225 is information for managing a correction rule that defines a class correction method. The details of the correction rule management information 225 will be described with reference to FIG. 7.

The auxiliary storage device 203 permanently stores data. As the auxiliary storage device 203, for example, a hard disk drive (HDD) and a solid state drive (SDD) are considered. The program and the information stored in the main storage device 202 may be stored in the auxiliary storage device 203. In this case, the processor 201 reads a program and information from the auxiliary storage device 203 and loads the program and the information to the main storage device 202.

The network interface 204 is an interface that is connected to another device via a network.

The input device 205 is a device used to input data to the computer 100. For example, the input device 205 includes a keyboard, a mouse, and a touch panel.

The output device 206 is a device that outputs an input screen, a processing result, and the like of data. The output device 206 includes a touch panel and a display.

FIG. 3 is a diagram illustrating an example of a data structure of the template information 221 according to the first embodiment.

The template information 221 includes entries formed from a template number 301, an attribute 302, positional information 303, and a requester name 304. One entry corresponds to one template. One entry includes one or more rows of attributes defined in a template.

The template number 301 is a field in which identification information for uniquely identifying a template is stored. In the embodiment, the identification information of the template is also used as identification information of an entry.

The attribute 302 is a field in which an identification name indicating a type of attribute included in a template is stored.

The positional information 303 is a field in which information regarding the position of an attribute corresponding to a type of attribute in a region forming a document is stored. More specifically, information regarding the position of an attribute corresponding to a type of attribute on a paper surface corresponding to one page is stored in the positional information 303. For example, coordinates of the upper left and lower right of a rectangular region are stored in the positional information 303. The coordinates may be relative coordinates indicating a relative positional relation between attributes or may be absolute coordinates indicating an absolute position on a paper surface. Information designating a plurality of positions may be stored in the positional information 303.

The invention is not limited to the information stored in the positional information 303. For example, the entry may include a field in which a length of an attribute and a range or the like in which the attribute is described are stored.

The requester name 304 is a field in which information indicating a user, a company, and the like to which a template is applied is stored. The template is applied to only a document including a tile (text string) of a specific requester.

The entry may include a filed in which a requester name is stored as information for selecting a template to be applied in addition to the requester name 304 and may include a filed in which a combination of a requester and an applicant is stored.

The template information 221 illustrated in FIG. 3 is information with a table format in which the template number 301 is set as the identification information of the entry, but may be information with a table format in which the requester name 304 is set as the identification information of the entry.

FIG. 4 is a diagram illustrating an example of a data structure of the word dictionary 222 according to the first embodiment.

The word dictionary 222 is information that defines a text string corresponding to a word extracted as an attribute and includes entries formed from an attribute 401 and a text string 402. One entry corresponds to one attribute.

In the attribute 401, an identification name of an attribute is stored. In the text string 402, a word (text string) classified as the attribute 401 is stored.

FIG. 5 is a diagram illustrating an example of a data structure of the notation dictionary 223 according to the first embodiment.

The notation dictionary 223 is information that defines a text string corresponding to a numerical value extracted as an attribute and includes entries formed from an attribute 501 and notation 502. One entry corresponds to one attribute.

In the attribute 501, an identification name of an attribute is stored. In the notation 502, a notation rule of a numerical value (text string) classified as the attribute 501 is stored.

FIG. 6 is a diagram illustrating an example of a data structure of the risk specifying rule management information 224 according to the first embodiment.

The risk specifying rule management information 224 includes a management table 600 in which a risk specifying rule for each different type of risk is managed. Identification information is assigned to each management table 600.

The risk specifying rule management information 224 illustrated in FIG. 6 includes two management tables 600-1 and 600-2. Identification information "A" is assigned to the management table 600-1 and identification information "B" is assigned to the management table 600-2.

The management table 600-1 is a table in which a condition of a text string for specifying a risk related to an amount is managed as a risk specifying rule and includes entries formed from a requester name 611 and a reference amount value 612. The requester name 611 is the same field as the requester name 304. The reference amount value 612 is a field in which a reference value of an amount (text string) which is a condition of the text string specified as a risk is stored. In the embodiment, when an amount equal to or greater than the reference amount value 612 is included in a document, it is determined that there is a risk.

For example, the computer 100 corrects a class so that an examiner can confirm the document summarization information 905 (see FIG. 9) when there is a document corresponding to the requester name 611 and an amount included in the document is equal to or greater than the reference amount value 612. Thus, it is possible to avoid a monetary loss occurring in work for treating a large amount.

The management table 600-2 is a table in which a text string for specifying a risk related to a work error is managed as a risk specifying rule and includes an entry formed from a risk word 621. The risk word 621 is a field in which a word (text string) for specifying a type or the like of examination in which an error of examination of electronic application occurs is stored.

For example, the computer 100 corrects a class so that an examiner can confirm the document summarization information 905 (see FIG. 9) when a text string in which an error of examination of electronic application is determined to be high is included in a document. Thus, it is possible to avoid the error of the examination.

In FIG. 6, the risk specifying rule defined based on the condition and the word of the billing amount is illustrated, but the risk specifying rule management information 224 may include the management table 600 in which risk specifying rules other than the above-described risk specifying rules are defined.

For example, conditions related to errors of remaining days until a date of payment and a calendar of a month of a date of issue and the date of payment are considered as rules. When there are many examination errors in specific dates and days of week, the dates and the days of week are considered as rules. When many numbers equal to or greater than a reference value are extracted from a document, it can also be considered that there is a high possibility of different numbers from desired numbers being extracted and a rule for correcting a class is set.

FIG. 7 is a diagram illustrating an example of a data structure of the correction rule management information 225 according to the first embodiment.

The correction rule management information 225 includes entries formed from a class condition 701, a conditional expression 702, and a correction class 703. One entry corresponds to a correction rule.

The class condition 701 is a field in which a condition of a class is stored. Specifically, identification information of the class before correction is stored in the class condition 701. The conditional expression 702 is a field in which a conditional expression related to a type of risk is stored. Specifically, a logical expression or the like using the identification information of the management table 600 is stored in the conditional expression 702.

The correction class 703 is a field in which a correction method is defined. Specifically, the identification information of the class after correction is stored in the correction class 703.

As will be described below, the computer 100 specifies whether there is each type of risk based on the risk specifying rule management information 224. The computer 100 determines whether a class of a document matches the class condition 701 and a combination of the types of specified risks satisfies the conditional expression 702. That is, it is determined whether there is a corresponding correction rule. The computer 100 corrects the class based on a determination result.

In the correction rule management information 225 illustrated in FIG. 7, the following two entries are stored. In the first entry, when the class before correction is Case 1 and there are the types of risks corresponding to the management table 600-2, a correction rule that corrects the class from Case 1 to Case 2 is set. In the second entry, when the class before correction is Case 0 and there are the types of risk corresponding to at least one of the management tables 600-1 and 600-2, a correction rule that corrects the class from Case 0 to Case 1 is set.

Figure 8:
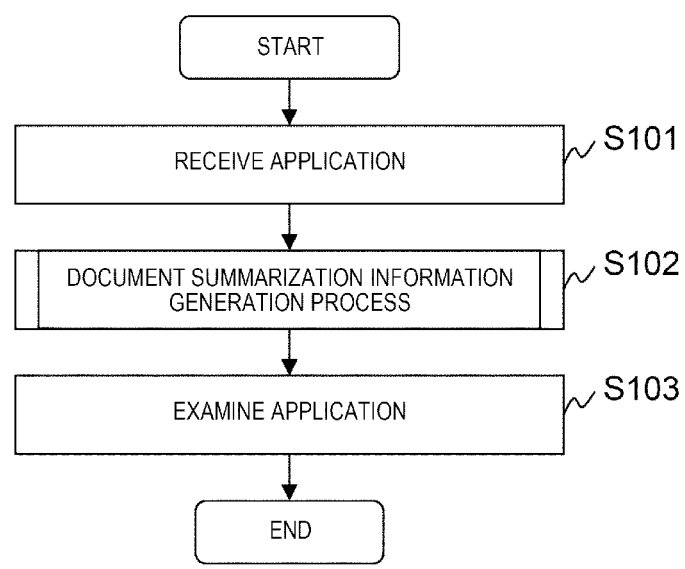
FIG. 8 is a flowchart illustrating an overview of a process performed by the computer according to the first embodiment.

FIG. 8 is a flowchart illustrating an overview of a process performed by the computer 100 according to the first embodiment.

The document examination module 211 of the computer 100 receives a request for an electronic application from the client terminal 120 operated by the user (step S101). The electronic application request includes the examination target document image data 901 (see FIG. 9).

When the document image data 901 is stored in an external storage device, the user may include identification information of the document image data 901 in the request for the electronic application. The user may submit a paper document. When the paper document is submitted, the computer 100 scans the paper document using the scanner 130 to generate the document image data 901.

Subsequently, the document examination module 211 of the computer 100 performs a document summarization information generation process (step S102).

In the document summarization information generation process, the document summarization information 905 (see FIG. 9) is generated. The document summarization information 905 is information in which attributes extracted from a document corresponding to the document image data 901 are summarized. In the case of the document image data 901 corresponding to a bill, the document summarization information 905 includes attributes (text string) corresponding to a billing amount, a bank name for specifying a transfer destination, a branch name, a type of account, an account number, a requester name, and a requested name, and the like. In the case of the document image data 901 corresponding to a receipt, the document summarization information 905 includes attributes (text string) corresponding to an amount, the name of a person or an organization purchasing an object or provided with a service, the name of a person or an organization selling the object or providing the service. In the case of the document image data 901 corresponding to a statement of earnings, the document summarization information 905 includes attributes (text string) corresponding to the name of a person, a number of an organization to which the person belongs, an income of the person, a collected amount of revenue of the person, and the like.

In the document summarization information generation process, the document examination module 211 calculates an index indicating credibility of the document summarization information 905 and determines the class of the document summarization information 905 based on the index. Further, the risk avoidance determination module 213 corrects the class based on the risk specifying rule management information 224 and the correction rule management information 225.

The computer 100 performs a confirmation operation such as correction of the document summarization information 905 in response to a confirmation operation in accordance with the class and outputs final document summarization information.

The details of the document summarization information generation process will be described with reference to FIGS. 9 and 10.

The computer 100 examines the electronic application using the document summarization information 905 (step S103). The computer 100 outputs one response of "permission" and "rejection" to the user as an examination result.

Figure 9:
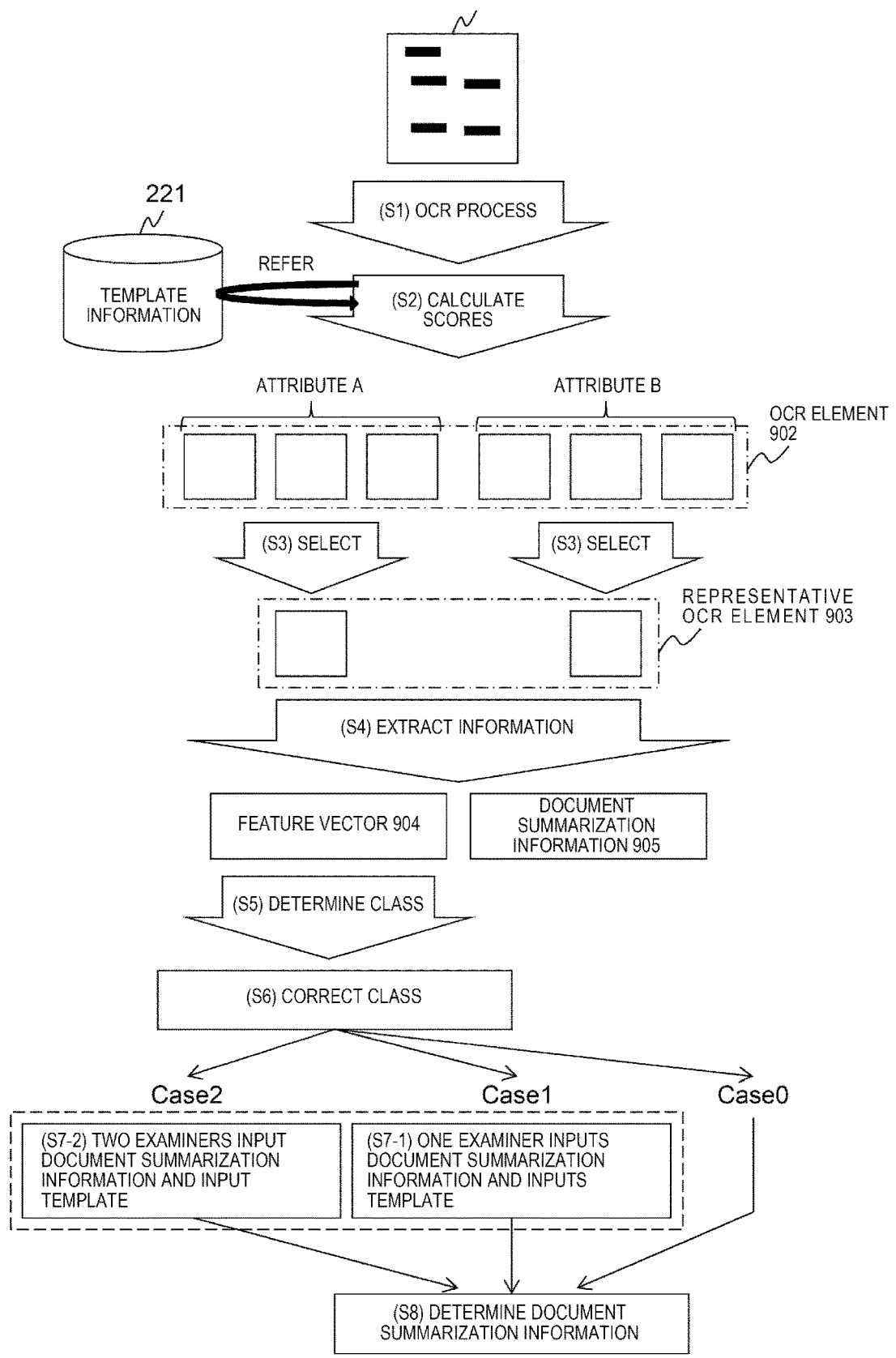
FIG. 9 is a diagram illustrating an overview illustrating a document summarization information generation process performed by a document examination module according to the first embodiment.

FIG. 9 is a diagram illustrating an overview illustrating the document summarization information generation process performed by the document examination module 211 according to the first embodiment. FIG. 10 is a diagram illustrating an example of a data structure of an OCR element generated by the document examination module 211 according to the first embodiment.

In step S1, the document examination module 211 performs an OCR process on the document image data 901 when the document image data 901 is input.

In step S2, the document examination module 211 calculates a score related to an attribute included in each template using a result of the OCR process and the template information 221. As will be described below, in the embodiment, a plurality of scores are calculated for one attribute. The document examination module 211 generates an OCR element 902 in which the attributes and the scores are associated with each other. One rectangle illustrated in FIG. 9 corresponds to one OCR element 902.

As illustrated in FIG. 10, the OCR element 902 includes an attribute 1001, an item value 1002, a position 1003, and a score 1004.

The attribute 1001 is a field in which the identification name of an attribute is stored. The item value 1002 is a field in which an attribute (text string) extracted from a document is stored. In the position 1003, the position of an attribute on a paper surface is stored. The score 1004 is a field group in which scores related to the OCR process, scores related to an attribute (text string) extracted using a template, and the like are stored.

In the embodiment, the OCR score and the position score are calculated. The OCR score is a score for evaluating a result of the OCR process. For example, the OCR score is a value or the like indicating the degree of matching between an extracted text string and a registered text figure. As the value of the OCR score is larger, a probability of a reading error is lower. The position score is a value indicating the degree of deviation between the position of an attribute in the document image data 901 and the position of an attribute in the template. As the value of the position score is smaller, the deviation is less.

The OCR element 902 may include only one of the OCR score and the position score. The OCR element 902 may include an area score related to the area of a rectangular region including an attribute, an item store related to a distance between the same types of attributes, and a number-of-appearances of score related to the number of times the attribute appears.

In step S3, the document examination module 211 selects a template appropriate for generating the document summarization information 905 based on the OCR element 902 of each template. In the selection of the template, for example, a method of selecting a template in which a sum value of the position scores is the maximum is considered.

Further, the document examination module 211 selects a representative OCR element 903 among the types of OCR elements 902 of the attributes included in the selected template. One rectangle illustrated in FIG. 9 corresponds to one representative OCR element 903. When the selected template includes three types of attributes, three representative OCR elements 903 are selected. As a method of selecting the representative OCR elements 903, for example, a method of selecting the OCR element with the maximum position score in the template selected in step S3 or a method of selecting the OCR element with the maximum sum value of the position score and the OCR score is considered.

In step S4, the document examination module 211 calculates a feature vector 904 and generates document summarization information 905 using the representative OCR element 903.

In the embodiment, a vector in which the plurality of scores included in each representative OCR element 903 are elements is generated as the feature vector 904. The document summarization information 905 is generated by arranging the attribute 1001 and the item value 1002 of the representative OCR element 903.

In step S5, the document examination module 211 calculates an evaluation value indicating credibility of the document summarization information 905 by substituting the feature vector 904 to an evaluation expression and determines the class based on the calculated evaluation value. A parameter of the evaluation expression is assumed to be set in advance. As another method, the document examination module 211 may determine the class by inputting the feature vector 904 to a classifier that performs machine learning in advance.

In the embodiment, when the evaluation value is equal to or greater than a first threshold, the class is determined to Case 0. When the evaluation value is less than the first threshold and is equal to or greater than the second threshold, the class is determined to Case 1. When the evaluation value is less than the second threshold, the class is determined to Case 2.

In step S6, the document examination module 211 corrects the class by instructing the risk avoidance determination module 213 to perform a process. The document examination module 211 performs a confirmation operation on the document summarization information 905 based on the class after correction.

When Case 0 is determined, the document summarization information 905 is not confirmed by an examiner. When Case 1 is determined, one examiner generates input document summarization information. When Case 2 is determined, two examiners each generate input document summarization information.

In step S8, the document examination module 211 selects the document summarization information to be used for the examination of application.

In the case of Case 0, the document summarization information 905 generated by the document examination module 211 is selected.

In the case of Case 1, the document examination module 211 determines whether the document summarization information 905 matches the input document summarization information generated by the examiner. When the determination result is YES, the document examination module 211 selects the document summarization information 905. When the determination result is NO, the document examination module 211 prompts the examiner inputting the input document summarization information or another examiner to correct the input document summarization information or generate new input document summarization information. In this case, the document examination module 211 selects the corrected input document summarization information or the new input document summarization information.

In the case of Case 2, the document examination module 211 determines whether the document summarization information 905 matches the input document summarization information generated by the two examiners. When the determination result is YES, the document examination module 211 selects the document summarization information 905. When the determination result is NO, the document examination module 211 prompts one of the examiners inputting the input document summarization information or another examiner to correct the input document summarization information or generate new input document summarization information. In this case, the document examination module 211 selects the corrected input document summarization information or the new input document summarization information.

Figure 11:
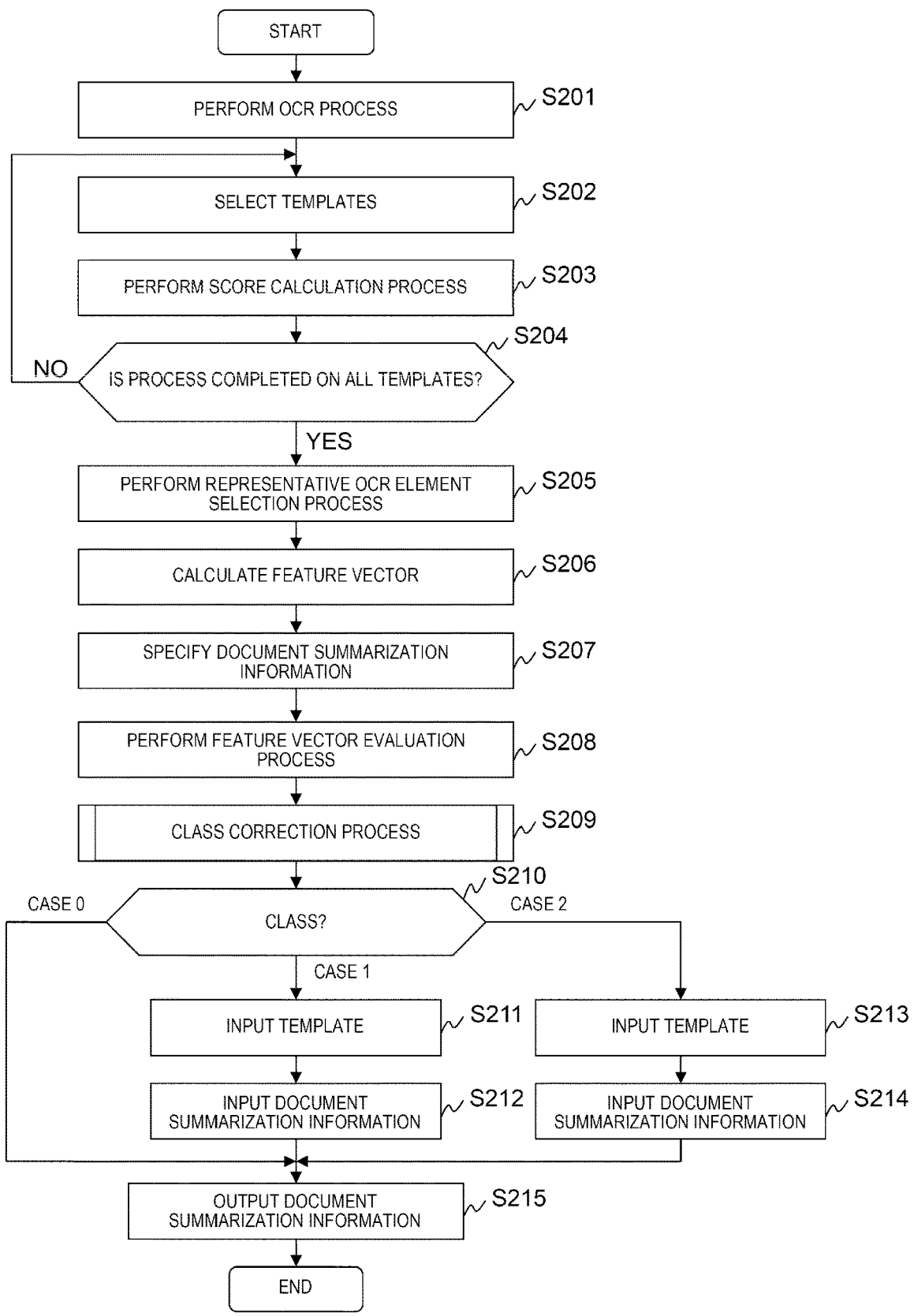
FIG. 11 is a flowchart illustrating the document summarization information generation process performed by the document examination module according to the first embodiment.

FIG. 11 is a flowchart illustrating the document summarization information generation process performed by the document examination module 211 according to the first embodiment.

The document examination module 211 starts the document summarization information generation process to be described below when the document image data 901 is input.

First, the document examination module 211 performs the OCR process on the document image data 901 (step S201). Since the OCR process may be performed using a known method, the detailed description thereof will be omitted. Through the OCR process, the document image data 901 is converted into data of a text string group which can be treated by the computer.

Subsequently, the document examination module 211 selects one template from the template information 221 (step S202). For example, the document examination module 211 selects the templates in order from the entries on the template information 221.

Subsequently, the document examination module 211 performs a score calculation process (step S203). In the score calculation process, the document examination module 211 generates the OCR element 902 for each type of attribute included in the selected template. The document examination module 211 calculates a score of the OCR element 902. Here, examples of a method of generating the OCR element 902 and a method of calculating the score will be described.

The document examination module 211 selects a type of target attribute from the types of attributes included in the selected template. That is, one of the attribute 302 included in the entry corresponding to the selected template is selected.

The document examination module 211 retrieves an attribute (text string) matching or similar to the text string 402 corresponding to the type of target attribute from the document image data 901 subjected to the OCR process with reference to the word dictionary 222. At this time, the document examination module 211 retrieves an attribute (text string) with matching or similar meaning in addition to the same text string as the text string 402 using a synonym dictionary (not illustrated). The document examination module 211 retrieves an attribute (text string) matching or similar to the notation 502 of the entry corresponding to the type of target attribute from the document image data 901 subjected to the OCR process with reference to the notation dictionary 223.

The document examination module 211 generates the null OCR element 902 and sets the type of target attribute in the attribute 1001. The document examination module 211 sets the retrieved attribute in the item value 1002 and sets the position of the retrieved attribute in the position 1003. At this time point, one OCR element 902 is generated for one retrieved attribute.

The document examination module 211 calculates a distance between the retrieved text strings based on the position 1003 of the OCR element 902 and integrates the OCR elements 902 of the text string in which the distance is equal to or less than a threshold into one OCR element 902. In this case, a plurality of values are set in the item value 802 and the position 803 of the integrated OCR element 902.

When no attribute is extracted despite the fact that either the word dictionary 222 or the notation dictionary 223 is used, the document examination module 211 sets type of target attribute in the attribute 801, sets the item value 802 and the position 803 to null, and sets all the values of the scores 804 to "0".

The document examination module 211 compares the text string 402 of the entry corresponding to the type of target attribute with the attribute extracted using the word dictionary 222 with reference to the word dictionary 222 and the item value 1002 and calculates a score based on a comparison result. The document examination module 211 compares the notation 502 of the entry corresponding to the type of target attribute with the attribute extracted using the notation dictionary 223 with reference to the notation dictionary 223 and the item value 1002 and calculates a score based on a comparison result. For example, the degree of matching between the attribute and at least single notation of the notation 502 is calculated as a score. The document examination module 211 sets a sum value of the two scores as an OCR score.

The document examination module 211 calculates an error of the position of the attribute using the positional information 303 in the row corresponding to the type of target attribute and the position 1003 and calculates a position score based on the error. For example, the position score is calculated using an expression in which the error is a parameter.

The document examination module 211 performs a similar process on all the types of attributes included in the selected template. The description returns to the document summarization information generation process.

Subsequently, the document examination module 211 determines whether the process is completed on all the templates (step S204).

When it is determined that the process is not completed on all the templates, the process returns to step S202 and the document examination module 211 performs a similar process.

When the process is determined to be completed on all the templates, the document examination module 211 performs the representative OCR element selection process (step S205).

In the representative OCR element selection process, the document examination module 211 selects a candidate OCR element of each type of attribute included in the template. The document examination module 211 calculates a comparison value which is a value for evaluating extraction precision of the attribute extracted using the template. The document examination module 211 selects the representative template using the comparison value of each template and selects the candidate OCR element corresponding to the representative template as the representative OCR element 903.

Subsequently, the document examination module 211 generates the feature vector 904 using the representative OCR element 903 (step S206) and generates the document summarization information 905 (step S207).

Subsequently, the document examination module 211 performs a feature vector evaluation process of calculating the evaluation value (step S208) and determines the class based on the evaluation value.

Subsequently, the document examination module 211 performs the class correction process (step S209).

Specifically, the document examination module 211 instructs the risk avoidance determination module 213 to start the class correction process. The details of the class correction process will be described with reference to FIG. 12. The document examination module 211 transitions to a standby state until process completion notification is received from the risk avoidance determination module 213.

Subsequently, the document examination module 211 determines whether the class after correction is Case 0, Case 1, or Case 2 (step S210).

When the class is Case 0, the document examination module 211 outputs the document summarization information 905 generated in step S207 (step S215). Thereafter, the document examination module 211 ends the process.

When the class is Case 1, the document examination module 211 receives inputting the input document summarization information and the templates generated by one examiner (steps S211 and S212). Thereafter, when the document summarization information 905 matches the input document summarization information, the document examination module 211 outputs the document summarization information 905 (step S215). Conversely, when the document summarization information 905 does not match the input document summarization information, the document examination module 211 outputs the input document summarization information (step S215).

When the class is Case 2, the document examination module 211 receives inputting the input document summarization information and the templates generated by the two examiners (steps S213 and S214). Thereafter, when the document summarization information 905 matches the input document summarization information, the document examination module 211 outputs the document summarization information 905 (step S215). Conversely, when the document summarization information 905 does not match the input document summarization information, the document examination module 211 outputs the input document summarization information (step S215).

Figure 12:
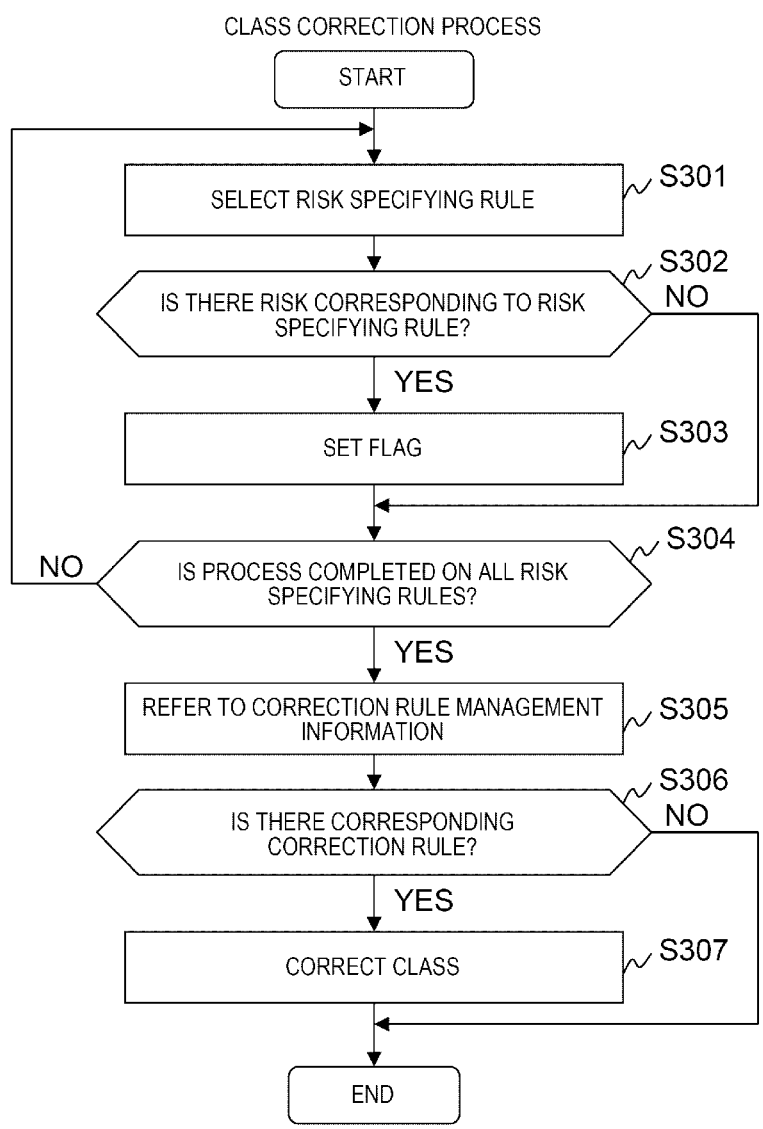
FIG. 12 is a flowchart illustrating a risk avoidance determination process performed by a risk avoidance determination module according to the first embodiment.

FIG. 12 is a flowchart illustrating the risk avoidance determination process performed by the risk avoidance determination module 213 according to the first embodiment.

The risk avoidance determination module 213 one risk specifying rule to be used from the risk specifying rules registered in the risk specifying rule management information 224 (step S301).

The risk avoidance determination module 213 determines whether there is a type of risk corresponding to the selected risk specifying rule in a document (step S302).

Specifically, referring to the document summarization information 905 or the OCR element 902, the risk avoidance determination module 213 determines whether there is a text string defined by the risk specifying rule or a text string satisfying a condition of the text string. When there is the text string defined by the risk specifying rule or the text string satisfying the condition of the text string, the risk avoidance determination module 213 determines that there is the type of risk corresponding to the selected risk specifying rule in the document.

When the risk avoidance determination module 213 determines that there is no type of risk corresponding to the selected risk specifying rule in the document, the risk avoidance determination module 213 allows the process to proceed to step S304.

When the risk avoidance determination module 213 determines that there is the type of risk corresponding to the selected risk specifying rule in the document, the risk avoidance determination module 213 sets a flag corresponding to the type of risk (step S303). Thereafter, the risk avoidance determination module 213 allows the process to proceed to step S304.

In the embodiment, the flag exists for each risk specifying rule. The risk avoidance determination module 213 may store the identification information of the risk specifying rule in the main storage device 202 instead of the flag.

In step S304, the risk avoidance determination module 213 determines whether the process is completed on all the risk specifying rules registered in the risk specifying rule management information 224 (step S304).

When the risk avoidance determination module 213 determines that the process is not completed on all the risk specifying rules, the process returns to step S301 and the risk avoidance determination module 213 performs a similar process.

When the risk avoidance determination module 213 determines that the process is completed on all the risk specifying rules, the risk avoidance determination module 213 determines whether there is a corresponding correction rule with reference to the correction rule management information 225 (step S305). Specifically, the following process is performed.

The risk avoidance determination module 213 retrieves an entry in which a current class matches the class condition 701. The risk avoidance determination module 213 determines whether the conditional expression 702 of the retrieved entry is satisfied based on a value of the flag. When the conditional expression 702 of the retrieved entry is satisfied, the risk avoidance determination module 213 determines that there is the corresponding correction rule.

When the risk avoidance determination module 213 determines that there is no corresponding correction rule, the risk avoidance determination module 213 ends the risk avoidance determination process.

When the risk avoidance determination module 213 determines that there is the corresponding correction rule, the risk avoidance determination module 213 corrects the class according to the corresponding correction rule (step S306). Thereafter, the risk avoidance determination module 213 ends the risk avoidance determination process.

Specifically, the risk avoidance determination module 213 changes the current class to a class set in the correction class 703.

Here, the class correction process will be described giving a specific example. In the computer 100, the risk specifying rule management information 224 illustrated in FIG. 6 and the correction rule management information 225 illustrated in FIG. 7 are assumed to be set.

A document in which "Corporation A" is included as an applicant and "60,000 yen" is included as a billing amount is considered.

In this case, a condition of the first entry of the management table 600-1 is satisfied. Accordingly, the risk avoidance determination module 213 determines that there is the type of risk corresponding to the management table 600-1 and determines that there is no type of risk corresponding to the management table 600-2. The risk avoidance determination module 213 sets the flag corresponding to the management table 600-1.

When the class before correction is "Case 0", the correction rule corresponding to the second entry of the correction rule management information 225 is satisfied. Therefore, the risk avoidance determination module 213 corrects the class from "Case 0" to "Case 1".

Next, a method of generating the risk specifying rule will be described with reference to FIGS. 13 to 17.

Figure 13:
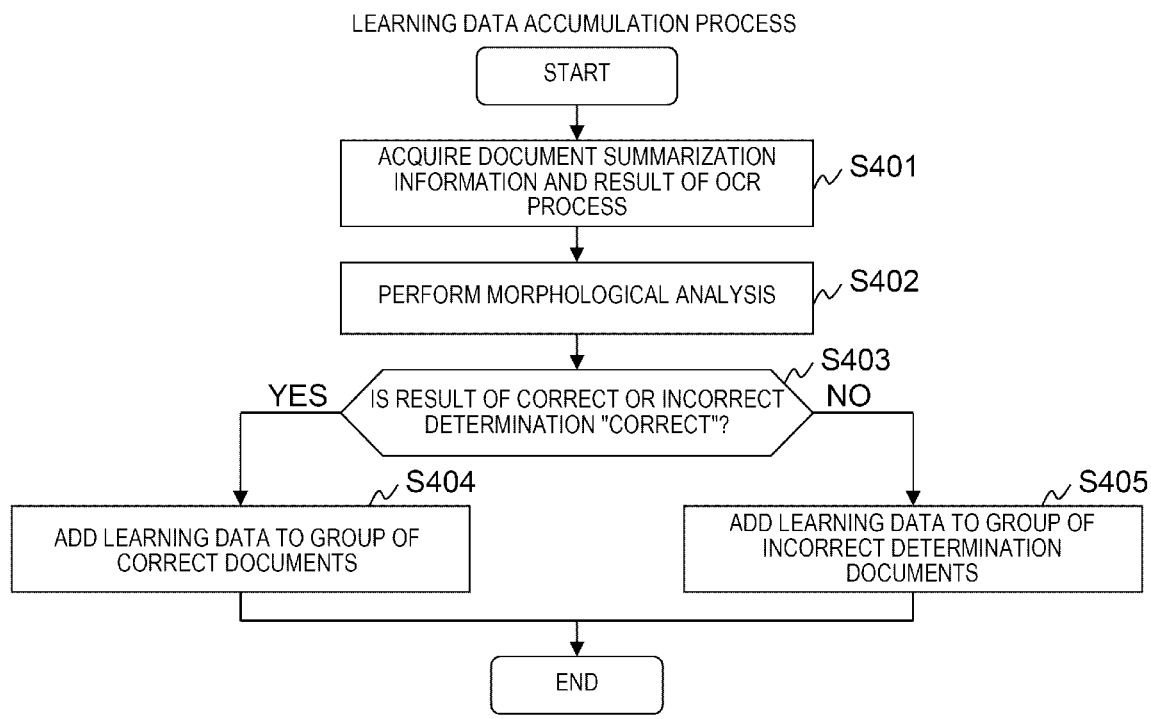
FIG. 13 is a flowchart illustrating an example of a learning data accumulation process performed by a learning processing module according to the first embodiment.

FIG. 13 is a flowchart illustrating an example of a learning data accumulation process performed by the learning processing module 212 according to the first embodiment.

The examination ends, the examiner confirms an examination result, whether the examination result is correct is determined, and subsequently the learning processing module 212 performs a process to be described below.

The learning processing module 212 acquires the document summarization information used for the examination and the result of the OCR process (step S401).

Subsequently, the learning processing module 212 performs morphological analysis on the text string extracted in the OCR process to acquire a collection of words (step S402). The learning processing module 212 may acquire a collection of the attributes as a collection of the words without performing the morphological analysis.

Subsequently, the learning processing module 212 determines whether the result of correct or incorrect determination on the examination result is "correct" (step S403).

When the learning processing module 212 determines that the result of the correct or incorrect determination on the examination result is "correct". The learning processing module 212 adds learning data in which a collection of the text strings such as a requester name, a billing amount, and words is associated, to a group of correct documents (step S404) and ends the process.

When the learning processing module 212 determines that the result of the correct or incorrect determination on the examination result is "incorrect determination", the learning processing module 212 adds learning data in which a collection of text strings such as a requester name, a billing amount, and words is associated, to a group of incorrect determination documents (step S405) and ends the process.

The above-described process may be performed on only a document for which the class is Case 1 or Case 2.

Figure 14:
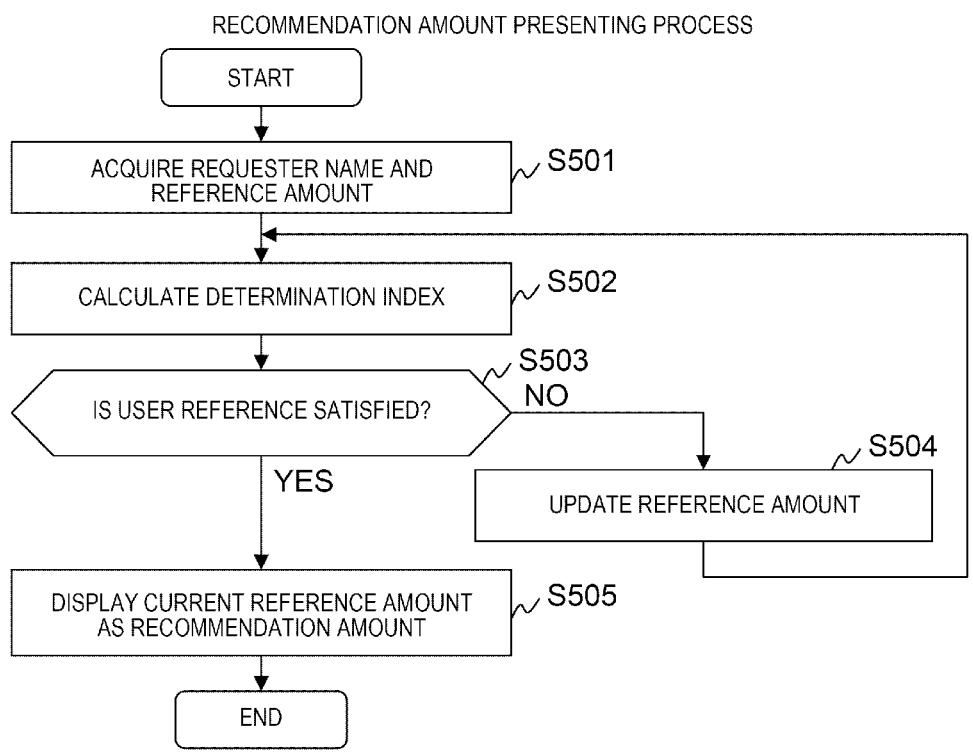
FIG. 14 is a flowchart illustrating an example of a recommendation amount presenting process performed by a rule generation module according to the first embodiment.

FIG. 14 is a flowchart illustrating an example of a recommendation amount presenting process performed by the rule generation module 214 according to the first embodiment.

The rule generation module 214 acquires a requester name and a reference amount (step S501). The requester name and the reference amount are input via a setting screen 1500 (see FIG. 15) to be described below.

Subsequently, the rule generation module 214 calculates a determination index using the learning data (step S502). The rule generation module 214 displays the calculated determination index on the setting screen 1500.

The invention is not limited to the type of determination index. The determination index is considered to be, for example, the following index. The rule generation module 214 calculates a ratio of documents including the amount equal to or less than the reference amount among the documents included in the group of the correct documents and the group of the incorrect determination documents as a first determination index (automatization ratio). The rule generation module 214 calculates a ratio of documents including the amount equal to or less than the reference amount among the documents included in the group of the incorrect determination documents as a second determination index (incorrect determination ratio).

Subsequently, the rule generation module 214 determines whether a user reference is satisfied by comparing the determination index with a target value (step S503).

For example, when the determination index is identical with the target value, when the determination index is greater than the target value, or when the determination index is less than the target value, it is determined that the user reference is satisfied. The target value and the user reference can be arbitrarily set. In the case of the determination performed using the above-described first determination index and second determination index, when one of the first determination index and the second determination index is not satisfied, it is determined that the user reference is not satisfied.

When it is determined that the user reference is not satisfied, the rule generation module 214 changes the reference amount (step S504). Thereafter, the process returns to step S502 and a similar process is performed. The invention is not limited to the method of changing the reference amount. For example, the rule generation module 214 adds or subtracts a given amount to or from the current reference amount. The rule generation module 214 may perform display to prompt the user to input a new reference amount on the setting screen 1500.

When it is determined that the user reference is satisfied, the rule generation module 214 displays the current reference amount as a recommendation amount on the setting screen 1500 (step S505). Thereafter, the rule generation module 214 ends the process.

Figure 15:
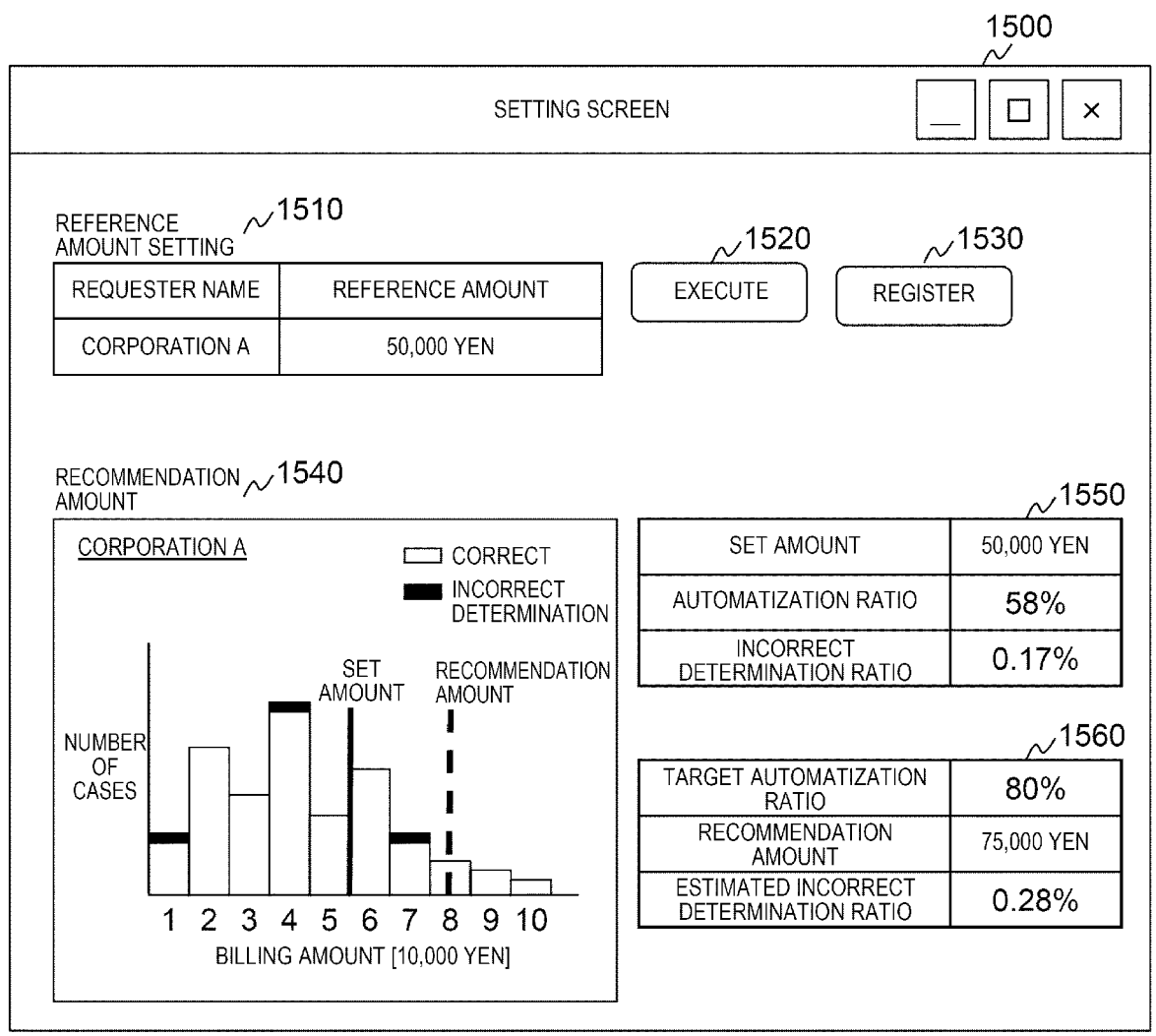
FIG. 15 is a diagram illustrating an example of a setting screen displayed by the computer according to the first embodiment.

FIG. 15 is a diagram illustrating an example of the setting screen 1500 displayed by the computer 100 according to the first embodiment.

The setting screen 1500 is a screen on which the risk specifying rule corresponding to the management table 600-1 is set. The setting screen 1500 includes a reference amount setting field 1510, an execution button 1520, a registration button 1530, a graph display field 1540, an index value display field 1550, and a recommendation amount display field 1560.

The reference amount setting field 1510 is a field in which a requester name and a reference amount are set. The execution button 1520 is a button used to instruct the rule generation module 214 to perform the recommendation amount presenting process. The registration button 1530 is a button used to register a combination of the requester name and the reference amount in the management table 600-1.

The graph display field 1540 is a field in which the recommendation amount is visually displayed. In the graph display field 1540, a distribution of the documents included in the correct group and the documents included in the group of the incorrect determination for each billing amount is displayed.

The index value display field 1550 is a field in which a value of the determination index calculated by the rule generation module 214 is displayed. In the embodiment, the automatization ratio and an incorrect determination ratio are displayed in the index value display field 1550.

The recommendation amount display field 1560 is a filed in which a target value and a recommendation amount are displayed. In the embodiment, a target automatization ratio which is the target value of the automatization ratio, the recommendation amount, and an estimated incorrect determination ratio are displayed in the recommendation amount display field 1560. The estimated incorrect determination ratio indicates an incorrect determination ratio when the target automatization ratio is satisfied. The recommendation amount display field 1560 may include a target incorrect determination ratio instead of the target automatization ratio.

The examiner sets a reference amount in the reference amount setting field 1510 and operates the registration button 1530 with reference to the recommendation amount and the distribution of the correct or incorrect determination result of the examination result displayed on the setting screen 1500. In this case, the rule generation module 214 registers an entry in which the requester name and the reference amount are associated, in the management table 600-1.

Figure 16:
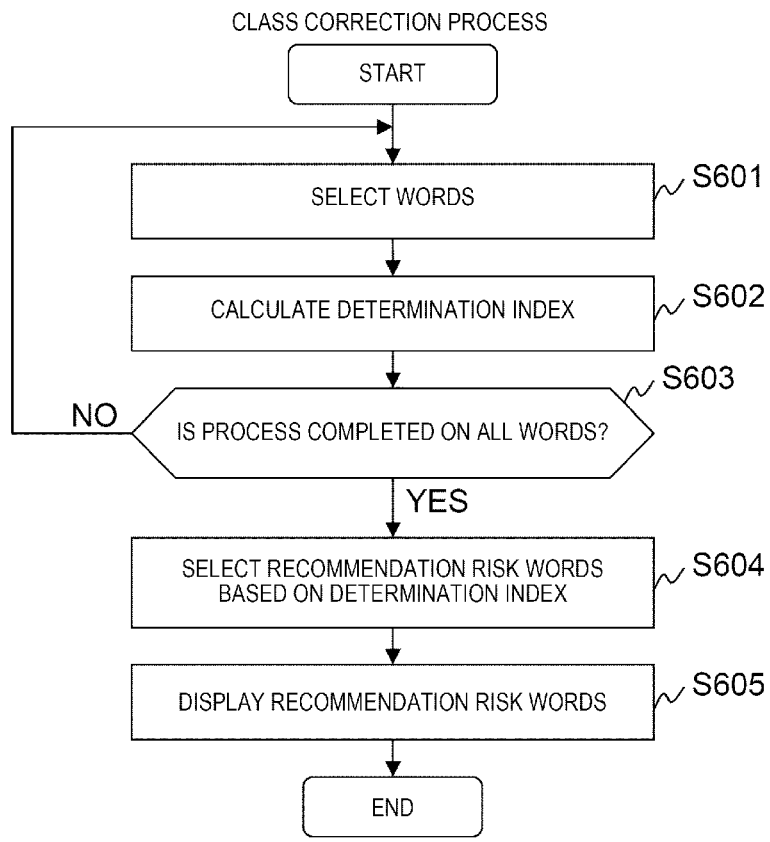
FIG. 16 is a flowchart illustrating an example of a recommendation risk word presenting process performed by the rule generation module according to the first embodiment.

FIG. 16 is a flowchart illustrating an example of a recommendation risk word presenting process performed by the rule generation module 214 according to the first embodiment.

The rule generation module 214 selects a target word from the group of the words (step S601).

Subsequently, the rule generation module 214 calculates a determination index of the target index (step S602). The rule generation module 214 displays the calculated determination index on a setting screen 1700 (see FIG. 17).

The invention is not limited to the type of determination index. For example, the rule generation module 214 calculates the incorrect determination ratio as the determination index based on the number of documents which are correct documents and include the target word and the number of documents which are incorrect determination documents and include the target word.

Subsequently, the rule generation module 214 determines whether the process is completed on all the words included in a group of the words (step S603).

When the rule generation module 214 determines that the process is not completed on all the words included in the group of the words, the process returns to step S601 and the rule generation module 214 performs a similar process.

When the rule generation module 214 determines that the process is completed on all the words included in the group of the words, the rule generation module 214 selects recommendation risk words based on the determination index (step S604) and displays the selected recommendation risk words on the setting screen 1700 (step S605). Thereafter, the rule generation module 214 ends the process.

For example, the rule generation module 214 selects a predetermined number of words in a descending order of the incorrect determination ratio as the recommendation risk words. The rule generation module 214 may select the words for which the incorrect determination ratio is greater than a threshold as the recommendation risk words.

In the embodiment, the incorrect determination ratio has been used as the determination index, but the invention is not limited thereto. For example, a correlation coefficient, a lift value, and the like may be used as the determination index.

Figure 17:
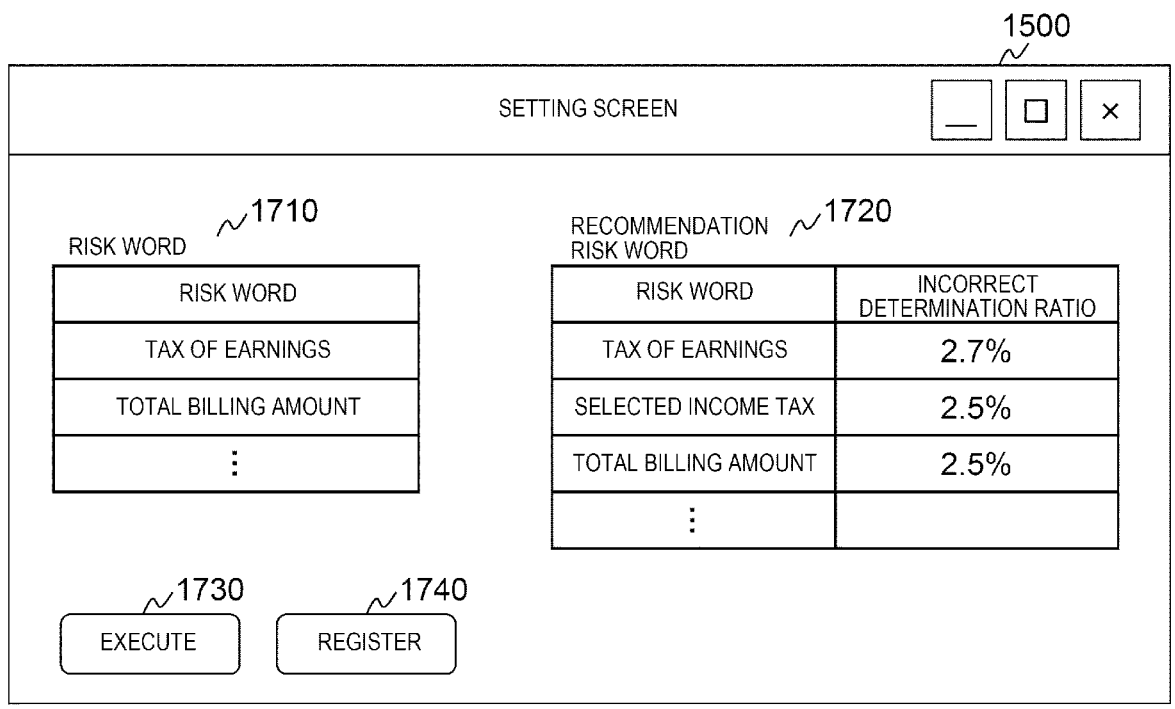
FIG. 17 is a diagram illustrating an example of a setting screen displayed by the computer according to the first embodiment.

FIG. 17 is a diagram illustrating an example of the setting screen 1700 displayed by the computer 100 according to the first embodiment.

The setting screen 1700 is a screen on which the risk specifying rule corresponding to the management table 600-2 is set. The setting screen 1700 includes a risk word display field 1710, a recommendation risk word display field 1720, an execution button 1730, and a registration button 1740.

The risk word display field 1710 is a field in which risk words registered in the management table 600-2 are displayed. The recommendation risk word display field 1720 is a field in which the recommendation risk word is displayed.

The execution button 1730 is a button used to instruct the rule generation module 214 to perform the recommendation risk word presenting process. The registration button 1740 is a button used to register a risk word in the management table 600-2.

When the risk word is set, the examiner selects one or more words in the recommendation risk word display field 1720 and operates the registration button 1740. In this case, the rule generation module 214 registers the selected word in the management table 600-2.

Next, a method of setting a template will be described with reference to FIG. 18.

In the embodiment, the attributes can be extracted from the document image data 901 with high precision by using the template set in the template information 221. However, there is the problem that man-hours are necessary to prepare templates of documents with various formats. Accordingly, the computer 100 according to the embodiment support generation of a template for reducing man-hours.

FIG. 18 is a diagram illustrating an example of a template input screen 1800 displayed by the computer 100 according to the first embodiment.

The template input screen 1800 is a screen on which a template is set and can be displayed at any timing in response to a request from the examiner.

The template input screen 1800 includes a document selection field 1810, a selection button 1820, an attribute setting field 1830, an addition button 1840, a position setting field 1850, and a registration button 1860.

The document selection field 1810 is a field in which a document which is a setting target of the template is selected. In the document selection field 1810, a list of documents determined by the template setting module 215 is displayed.

The selection button 1820 is a button used to select the document which is the setting target of the template.

The attribute setting field 1830 is a field in which the types of attributes included in the template are set.

The addition button 1840 is a button used to add a row to the attribute setting field 1830.

The position setting field 1850 is a field in which the positions of the attributes on the paper surface corresponding to the types of the attributes set in the attribute setting field 1830 are set.

The registration button 1860 is a button used to set the template input on the screen in the template information 221.

When the examiner selects the document displayed in the document selection field 1810 and operates the selection button 1820, document image data 901 selected in the position setting field 1850 is displayed. The examiner can set the positional information 303 of the attribute by selecting a rectangular region so that the text string displayed in the position setting field 1850 is surrounded.

Positional information of the representative OCR element 903 included in the document summarization information 905 corresponding to the document selected in the document selection field 1810 can be set and displayed as an initial value of the positional information of each attribute in the position setting field 1850. In this case, the examiner confirms the position of each attribute displayed in the position setting field 1850 and does not perform an operation corresponding to the position setting field 1850 when correction is not necessary. Thus, it is possible to reduce man-hours necessary to set the template.

When the examiner operates the registration button 1860, the template setting module 215 adds an entry to the template information 221 and sets the identification number in the template number 301 of the added entry. The template setting module 215 generates the same number of rows as the number of types of attributes set in the attribute setting field 1830 to the added entry and sets a value of the attribute setting field 1830 in the attribute 302 excluding each row. The template setting module 215 sets a value in the positional information 303 in each row based on the position setting field 1850.

Here, a method of determining a document to be displayed in the document selection field 1810 will be described.

The template setting module 215 selects documents in which there is no selectable template or documents in which the position score calculated using the selected template is less than a preset threshold as a template generation target document among the documents processed by the document examination module 211 and generates a list of the selected documents. The template setting module 215 displays the generated list in the document selection field 1810.

Through the above-described process, control can be performed such that the template of a document in which the positions of the existing templates and attributes are similar is not generated.

As another determination method, the template setting module 215 groups the documents which are the template generation targets selected in accordance with the above-described method, selects one or more documents from each group, and generates a list of the documents selected. The template setting module 215 displays the generated list in the document selection field 1810. As a grouping method, a method of grouping the documents based on the values of the attributes such as the requester name or a method of clustering the documents using the positional information included in the representative OCR element 903 included in the document summarization information 905 is considered. The above-described methods may be combined.

According to the embodiment, the computer 100 can select an optimum template based on the score. The computer 100 determines a type (class) of confirmation operation for the document summarization information 905 based on the evaluation value indicating the credibility of the document summarization information 905. Further, the computer 100 corrects the type of confirmation operation based on whether there is each type of risk.

Thus, it is possible to automatically identify the attributes with high precision and confirm the identification result of the attributes in consideration of a work-related loss. Accordingly, it is possible to realize examination efficiency while avoiding occurrence of a risk in the examination of the electronic application.

The invention is not limited to the foregoing embodiments, but various modification examples are included. For example, in the foregoing embodiments, the configurations have been described in detail to easily describe the invention and all of the above-described configurations may not necessarily be included. Some of the configurations in each embodiment may be added to, deleted from, or replaced with other configurations.

Some or all of the foregoing configurations, functions, processing units, and processing mechanisms may be realized as hardware by designing, for example, integrated circuits. The invention can also be realized by a program code of software realizing the functions of the embodiments. In this case, a storage medium on which the program code is recorded is provided to a computer and the program code stored in the storage medium is read by a processor included in the computer. In this case, the program code read from the storage medium realizes the functions of the above-described embodiments, and thus the program code and the storage medium storing the program code embody the invention. Examples of the storage medium providing the program code include a flexible disk, a CD-ROM, a DVD-ROM, a hard disk, a solid state drive (SSD), an optical disc, a magneto-optical disc, a CD-R, a magnetic tape, a non-volatile memory card, and a ROM.

The program code realizing the functions described in the embodiments can be mounted with, for example, any of diverse programs or script languages such as Assembler, C/C++, Perl, Shell, PHP, and Java (registered trademark).

Further, the program code of software realizing the functions of the embodiments may be delivered via a network, the program code may be stored in a storage unit such as a hard disk or a memory of a computer or a storage medium such as a CD-RW or a CD-R, and a processor included in a computer may read the program code stored in the storage unit or the storage medium to execute the program code.

In the above-described embodiments, control lines and information lines indicate that description is necessary and all the control lines or the information lines may not necessarily be indicated on a product. All the configurations may be connected to each other.

What is claimed is:

1. A computer that extracts an attribute which is a text string contained in a predetermined examination target document, the computer comprising:

a processor; and a storage device that is connected to the processor, wherein the storage device stores template information for managing a plurality of templates in which at least one type of attribute is defined, wherein the template information includes a plurality of entries formed of identification information of the template and identification information indicating the type of attribute, and wherein the processor executes a text recognition process on image data of the document, extracts an attribute corresponding to the type of attribute defined in each of the plurality of templates using a result of the text recognition process and the plurality of templates, selects a template based on the extracted attribute, generates output information that includes the attribute extracted using the selected template and is used for an examination, calculates an evaluation value indicating credibility of the output information, determines a type of confirmation operation performed on the output information, before the examination, based on a comparison result between the evaluation value and a threshold, determines whether it is necessary to correct the determined type of confirmation operation, based on a text string contained in the document, and corrects the determined type of confirmation operation when the processor determines that it is necessary to correct the determined type of confirmation operation.

2. The computer according to claim 1, wherein the storage device stores first management information for managing a risk specifying rule that defines a text string for specifying a type of risk which is likely to occur in the examination or a condition of the text string and second management information for managing a correction rule that defines a correction method for the determined type of confirmation operation for the output information, wherein the first management information stores information regarding the risk specifying rule corresponding to another type of risk, wherein the correction rule is formed of a conditional expression defined by a combination of a type of confirmation operation before the correction and the specified type of risk, and a type of confirmation operation after the correction, and wherein the processor specifies a type of risk which is in the document based on the first management information and the output information, determines whether there is a corresponding correction rule with reference to the second management information based on the combination of the type of confirmation operation before the correction and the specified type of risk, and corrects the determined type of confirmation operation based on the corresponding correction rule when the processor determines that there is the corresponding correction rule.

3. The computer according to claim 2, wherein the processor stores learning data in which an attribute extracted from the document is associated with a result of the examination obtained using the output information operated in accordance with the determined type of confirmation operation, in the storage device, generates display information for displaying a text string in which a predetermined type of risk is likely to occur or a condition of the text string by performing a learning process using the learning data, and outputs the generated display information.

4. The computer according to claim 2, wherein the first management information includes a risk specifying rule that defines a condition of a magnitude relation of a text string corresponding to a numerical value.

5. A document identifying method performed by a computer that extracts an attribute which is a text string contained in a predetermined examination target document, wherein the computer includes a processor and a storage device that is connected to the processor, wherein the storage device stores template information for managing a plurality of templates in which at least one type of attribute is defined, wherein the template information includes a plurality of entries formed of identification information of the template and identification information indicating the type of attribute, and wherein the document identifying method comprises:

a first step of executing, by the processor, a text recognition process on image data of the document;

a second step of extracting, by the processor, an attribute corresponding to the type of attribute defined in each of the plurality of templates using a result of the text recognition process and the plurality of templates;

a third step of selecting, by the processor, a template based on the extracted attribute;

a fourth step of generating, by the processor, output information that includes the attribute extracted using the selected template and is used for an examination;

a fifth step of calculating, by the processor, an evaluation value indicating credibility of the output information;

a sixth step of determining, by the processor, a type of confirmation operation performed on the output information, before the examination, based on a comparison result between the evaluation value and a threshold;

a seventh step of determining, by the processor, whether it is necessary to correct the determined type of confirmation operation, based on a text string contained in the document; and an eighth step of correcting, by the processor, the determined type of confirmation operation when the processor determines that it is necessary to correct the determined type of confirmation operation.

6. The document identifying method according to claim 5, wherein the storage device stores first management information for managing a risk specifying rule that defines a text string for specifying a type of risk or a condition of the text string which is likely to occur in the examination and second management information for managing a correction rule that defines a correction method for the determined type of confirmation operation for the output information, wherein the first management information stores information regarding the risk specifying rule corresponding to another type of risk, wherein the correction rule is formed a conditional expression defined by a combination of a type of confirmation operation before the correction and the specified type of risk, and a type of confirmation operation after the correction, and wherein the seventh step includes a step of specifying, by the processor, a type of risk which is in the document based on the first management information and the output information and a step of determining, by the processor, whether there is a corresponding correction rule with reference to the second management information based on the combination of the type of confirmation operation before the correction and the specified type of risk, and wherein the eighth step includes a step of correcting, by the processor, the determined type of confirmation operation based on the corresponding correction rule.

7. The document identifying method according to claim 6, further comprising:

a step of storing, by the processor, learning data in which the attribute extracted from the document is associated with a result of the examination obtained using the output information operated in accordance with the determined type of confirmation operation, in the storage device, a step of generating, by the processor, display information for displaying a text string or a condition of the text string in which a predetermined type of risk is highly likely to occur by performing a learning process using the learning data, and a step of outputting, by the processor, the generated display information.

8. The document identifying method according to claim 6, wherein the first management information includes a risk specifying rule that defines a condition of a magnitude relation of a text string corresponding to a numerical value.

* * * * *